United States Patent
Kokubu et al.

(10) Patent No.: US 8,109,487 B2
(45) Date of Patent: Feb. 7, 2012

(54) LINEAR SOLENOID DEVICE AND ELECTROMAGNETIC VALVE

(75) Inventors: Takahiro Kokubu, Anjo (JP); Masaya Nakai, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 579 days.

(21) Appl. No.: 12/292,249

(22) Filed: Nov. 14, 2008

(65) Prior Publication Data
US 2009/0140189 A1    Jun. 4, 2009

(30) Foreign Application Priority Data

Nov. 21, 2007    (JP) .................... 2007-301603

(51) Int. Cl.
*F16K 31/02* (2006.01)

(52) U.S. Cl. .............. 251/129.15; 335/279; 335/281

(58) Field of Classification Search ........... 251/129.15, 251/129.01; 335/279, 281
See application file for complete search history.

(56) References Cited

U.S. PATENT DOCUMENTS

| | | | | |
|---|---|---|---|---|
| 6,029,704 | A * | 2/2000 | Kuroda et al. | 137/625.65 |
| 6,206,343 | B1 * | 3/2001 | Kato et al. | 251/129.15 |
| 6,409,144 | B1 * | 6/2002 | Inami | 251/129.15 |
| 6,498,416 | B1 * | 12/2002 | Oishi et al. | 310/214 |
| 6,557,823 | B2 * | 5/2003 | Sakai et al. | 251/129.15 |
| 6,824,120 | B2 * | 11/2004 | Furuta et al. | 251/355 |
| 7,219,875 | B2 * | 5/2007 | Dayton | 251/129.15 |
| 7,243,680 | B2 * | 7/2007 | Golovatai-Schmidt et al. | 137/596.17 |
| 7,458,557 | B2 * | 12/2008 | Tsujimura et al. | 251/129.15 |
| 7,581,302 | B2 * | 9/2009 | Tyler | 29/557 |
| 2001/0048091 | A1 * | 12/2001 | Enomoto et al. | 251/129.15 |
| 2002/0101314 | A1 * | 8/2002 | Oishi et al. | 335/256 |
| 2003/0020038 | A1 * | 1/2003 | Miyamoto et al. | 251/129.15 |
| 2003/0047699 | A1 * | 3/2003 | Sakata et al. | 251/129.15 |
| 2004/0056227 | A1 * | 3/2004 | Mayr et al. | 251/129.15 |
| 2004/0113112 | A1 * | 6/2004 | Hirata et al. | 251/129.15 |
| 2005/0067597 | A1 * | 3/2005 | Yamamoto et al. | 251/129.15 |
| 2005/0279957 | A1 * | 12/2005 | Inami et al. | 251/129.15 |
| 2006/0011245 | A1 | 1/2006 | Suzuki et al. | |
| 2006/0054852 | A1 | 3/2006 | Kokubu et al. | |

FOREIGN PATENT DOCUMENTS

| | | |
|---|---|---|
| JP | A 04-263407 | 9/1992 |
| JP | A 2000-283314 | 10/2000 |
| JP | A 2006-112620 | 4/2006 |
| JP | A-2006-118701 | 5/2006 |

* cited by examiner

*Primary Examiner* — John Fristoe, Jr.
*Assistant Examiner* — Marina Tietjen
(74) *Attorney, Agent, or Firm* — Oliff & Berridge, PLC

(57) ABSTRACT

A linear solenoid device comprising an energizable coil; a movable core; a first fixed core as a magnetic member having a recess capable of accommodating one end of the movable core; a second fixed core as a magnetic member having an inner peripheral surface slidably supporting the movable core; and an annular non-magnetic member coaxially connecting the first fixed core and the second fixed core to each other, wherein the linear solenoid device is capable of being driven by an attraction force applied to the movable core towards the first fixed core upon energization of the coil, and the non-magnetic member is formed so that an inner peripheral surface of the non-magnetic member functions together with the inner peripheral surface of the second fixed core as a sliding surface along which the movable core is slidable.

11 Claims, 3 Drawing Sheets

LINEAR SOLENOID DEVICE AND ELECTROMAGNETIC VALVE

INCORPORATION BY REFERENCE

The disclosure of Japanese Patent Application No. 2007-301603 filed on Nov. 21, 2007 including the specification, drawings and abstract is incorporated herein by reference in its entirety.

BACKGROUND

The present invention relates to an electromagnetic valve including a linear solenoid device.

There exists an electromagnetic valve that includes a plunger, a yoke having an inner peripheral surface slidably supporting the plunger, and a core having a recess and a tapered portion. The recess is capable of accommodating a tip of the plunger as the plunger is moved, and the tapered portion has an outer diameter tilted at a predetermined angle (e.g., see Japanese Patent Application Publication No. JP-A-2006-118701). In this electromagnetic valve, the yoke and core are connected to each other by a cylindrical stainless ring provided as a non-magnetic body. The cylindrical stainless ring magnetically isolates the yoke and the core from each other and coaxially holds the yoke and the core.

SUMMARY

If slidability of the plunger is not enough in the conventional electromagnetic valve, a relatively large magnetic clearance is required to be set between an inner peripheral surface of the yoke and an outer peripheral surface of the plunger in order to ensure the slidability. This reduces magnetic efficiency. Since reduction in magnetic efficiency causes reduction in attraction force of the plunger, a large solenoid is required in order to ensure the required attraction force of the plunger.

It is a primary object of the present invention to improve device capability by improving slidability of a movable core in a linear solenoid device and an electromagnetic valve. The present invention can also achieve various other advantages.

In order to achieve the above object, the linear solenoid device according to the present invention includes: an energizable coil; a movable core; a first fixed core as a magnetic member having a recess capable of accommodating one end of the movable core; a second fixed core as a magnetic member having an inner peripheral surface slidably supporting the movable core; and an annular non-magnetic member coaxially connecting the first fixed core and the second fixed core to each other, wherein the linear solenoid device is capable of being driven by an attraction force applied to the movable core towards the first fixed core upon energization of the coil, and the non-magnetic member is formed so that an inner peripheral surface of the non-magnetic member functions together with the inner peripheral surface of the second fixed core as a sliding surface along which the movable core is slidable.

BRIEF DESCRIPTION OF THE DRAWINGS

Exemplary embodiments of the invention will now be described with reference to the accompanying drawings, wherein.

DETAILED DESCRIPTION OF EMBODIMENTS

Embodiments according to the present invention will be described below with reference to the drawings.

Figure 1:
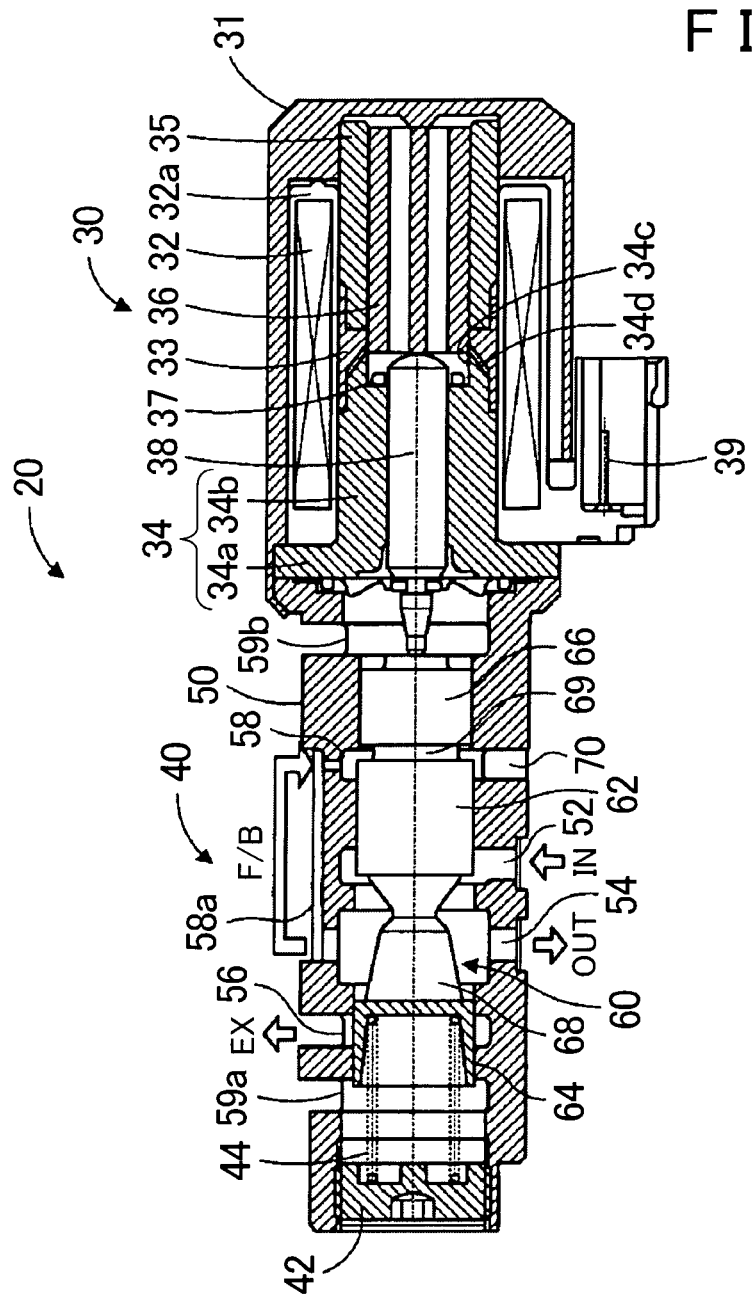
FIG. 1 is a structural diagram schematically showing a structure of an electromagnetic valve according to an embodiment of the present invention.

FIG. 1 is a structural diagram schematically showing a structure of an electromagnetic valve 20 according to an embodiment of the present invention. The electromagnetic valve 20 of the embodiment is structured as a linear solenoid valve for use in, for example, hydraulic control of a clutch and a brake incorporated in an automatic transmission. As shown in the figure, the electromagnetic valve 20 includes a solenoid portion 30 and a pressure-regulating valve portion 40 that is driven by the solenoid portion 30 to regulate a received oil pressure and output the resultant oil pressure.

The solenoid portion 30 includes a case 31 as a bottomed cylindrical member, a coil 32, a first core 34, a cylindrical second core 35, an annular non-magnetic body 33, a plunger 36, and a shaft 38. The coil 32 is disposed on the inner peripheral side of the case 31 and has an insulated wire wound around an insulating bobbin 32a. The first core 34 is formed by a flange portion 34a having its outer periphery fixed to an opening end of the case 31 and a cylindrical portion 34b axially extending from the flange portion 34a along an inner peripheral surface of the coil 32. The cylindrical second core 35 contacts an inner peripheral surface of a recess formed in a bottom of the case 31 and axially extends along the inner peripheral surface of the coil 32 to a position located at a predetermined distance from the cylindrical portion 34b of the first core 34. The annular non-magnetic body 33 coaxially connects the first core 34 and the second core 35 to each other. The plunger 36 is inserted in the second core 35 and is axially slidable along an inner peripheral surface of the second core 35. The shaft 38 is inserted in the cylindrical portion 34b of the first core 34, abuts on a tip of the plunger 36, and is axially slidable along an inner peripheral surface of the cylindrical portion 34b. In the solenoid portion 30, a terminal from the coil 32 is arranged in a connecter portion 39 formed on the outer periphery of the case 31. The coil 32 is energized through the terminal.

Figure 2:
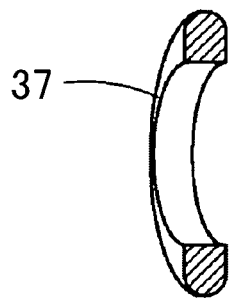
FIG. 2 is a cross-sectional view of a spacer.

The first core 34 has a recess 34c along an inner surface of a tip portion of the cylindrical portion 34b and a tapered portion 34d along an outer surface of the tip portion of the cylindrical portion 34b. The recess 34c is formed so that the tip portion of the plunger 36 can be fittingly inserted therein. The plunger 36 has a larger outer diameter than that of the shaft 38. The tapered portion 34d has an outer diameter reduced toward the tip thereof. A ring-shaped spacer 37 made of a non-magnetic material is disposed in the recess 34c so that the plunger 36 does not abut directly on the first core 34. The spacer 37 serves to prevent the plunger 36 from becoming inseparable from the first core 34 due to residual magnetism applied when the coil 32 is deenergized. FIG. 2 shows a cross-sectional view of the spacer 37. As shown in the figure, the spacer 37 has a rounded outer peripheral surface in order to prevent the spacer 37 from standing on the outer peripheral surface when the spacer 37 is placed into the recess 34c of the first core 34 in assembling operation.

Figure 3:
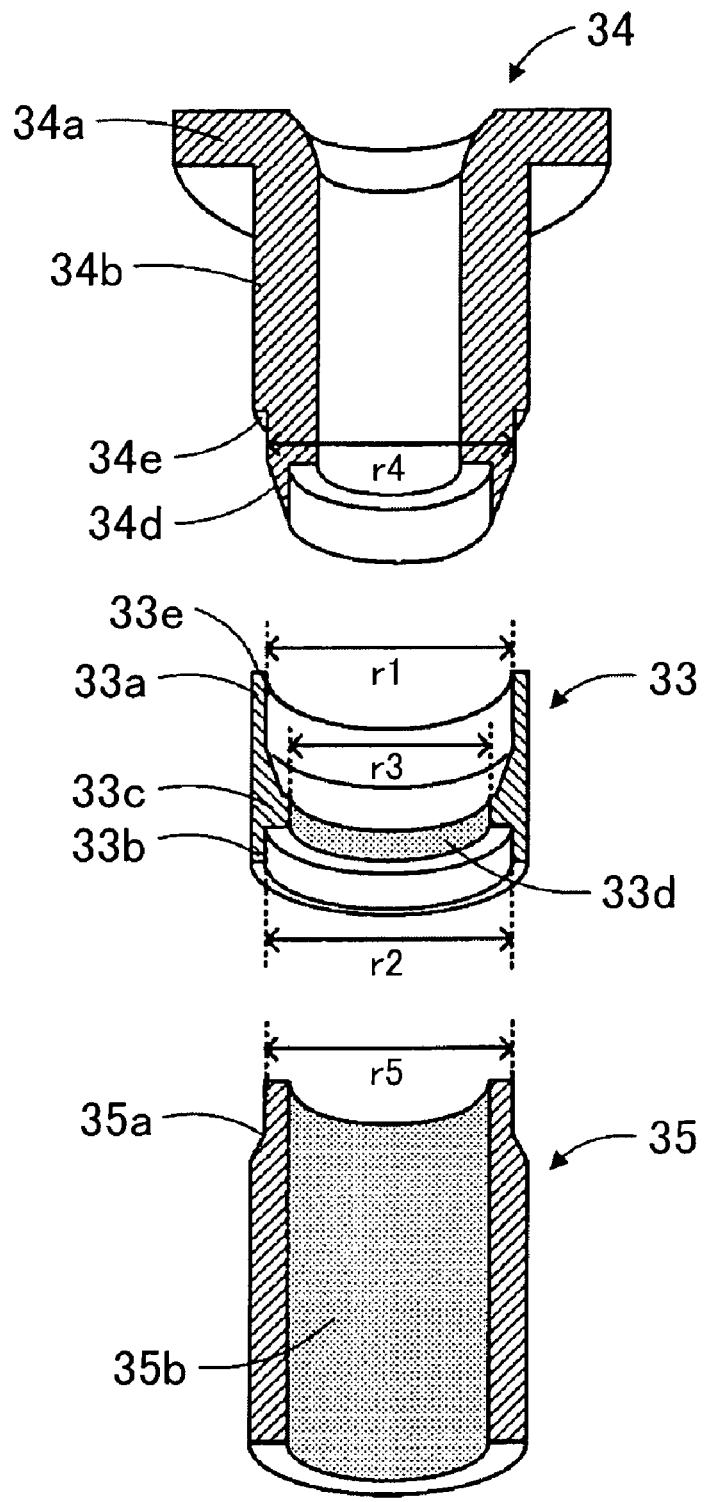
FIG. 3 is a cross-sectional perspective view showing respective cross sections of a first core, a non-magnetic body, and a second core.
Figure 4:
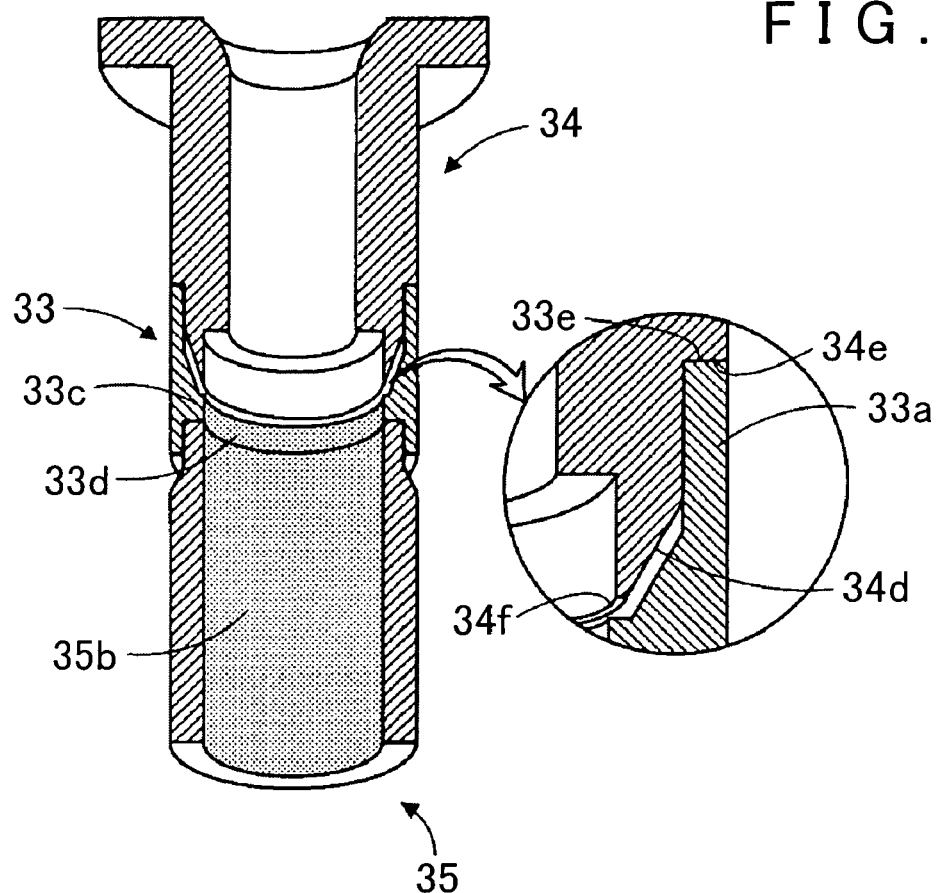
FIG. 4 is a cross-sectional perspective view showing a cross section of a state after the first core, the non-magnetic body, and the second core are assembled together.

The case 31, the first core 34, the second core 35, and the plunger 36 are made of a ferromagnetic material such as high-purity iron. Note that an outer surface of the plunger 36 is plated with a non-magnetic material such as nickel and phosphorus, and this plating forms a non-magnetic layer. The non-magnetic body 33 is made of a non-magnetic metal such as stainless steel and brass, and magnetically isolates the first core 34 and the second core 35 as magnetic bodies from each other. FIG. 3 shows respective cross-sectional perspective views of the first core 34, the second core 35, and the non-magnetic body 33. FIG. 4 shows a cross-sectional view of a state in which the first core 34, the second core 35, and the non-magnetic body 33 are assembled together.

As shown in FIG. 3, the non-magnetic body 33 is formed as a cylindrical member having a wall thickness varied between its middle part and its ends in the axial direction. A thin wall portion 33a having an inner diameter r1 is formed at one end of the non-magnetic body 33, a thin wall portion 33b having an inner diameter r2 is formed at the other end thereof, and a thick wall portion 33c having an inner diameter r3 is formed in the middle. The first core 34 has a stepped portion 34e having an outer diameter r4 approximately equal to the inner diameter r1 of the thin wall portion 33a. The non-magnetic body 33 and the first core 34 can be joined together by pressing the thin wall portion 33a into the stepped portion 34e. The axial length of the thin wall portion 33a of the non-magnetic body 33 to be pressed into the stepped portion 34e of the first core 34 is designed so that the thick wall portion 33c does not contact the tapered portion 34d of the first core 34 and a tip portion 34f of the tapered portion 34d when an abutting portion 33e at a tip of the thin wall portion 33a abuts on the stepped portion 34e of the first core 34 (see the circled enlarged view in FIG. 4).

In the embodiment, in view of the manufacturing tolerance of the non-magnetic body 33 and the first core 34, the axial length of the thin wall portion 33a of the non-magnetic body 33 is designed so that the gap produced is minimized in such a range that the thick wall portion 33c does not contact the tapered portion 34d and the tip portion 34f. Note that the thickness of the tip portion 34f is adjusted so that a flat attraction property showing a small change in attraction force with respect to a stroke of the plunger 36 can be obtained. The second core 35 has a stepped portion 35a having an outer diameter r5 approximately equal to the inner diameter r2 of the thin wall portion 33b. The non-magnetic body 33 and the second core 35 can be joined together by pressing the thin wall portion 33b into the stepped portion 35a.

As shown in FIG. 4, the thickness of the thick wall portion 33c of the non-magnetic body 33 is designed so that an inner peripheral surface 33d of the thick wall portion 33c and an inner peripheral surface 35b of the second core 35 become flush with each other. In the embodiment, the non-magnetic body 33 and the second core 35 are first molded by press working such as cold forging. The thin wall portion 33b of the non-magnetic body 33 is then pressed into the stepped portion 35a of the second core 35, and the non-magnetic body 33 and the second core 35 are joined together by brazing or the like. An inner wall of the non-magnetic body 33 and the second core 35 thus joined together is then subjected to cutting. The non-magnetic body 33 and the second core 35 thus formed can be regarded as an integral member in terms of dimensional accuracy.

Accordingly, by joining the first core 34 to the integral member, part accuracy can be improved as compared to the case where the inner peripheral surface 33d of the thick wall portion 33c of the non-magnetic body 33 and the inner peripheral surface 35b of the second core 35 are formed separately and the first core 34, the non-magnetic body 33, and the second core 35 are then joined together. The inner peripheral surface 33d of the thick wall portion 33c of the non-magnetic body 33 thus formed functions together with the inner peripheral surface 35b of the second core 35 as a sliding surface slidably supporting the plunger 36.

Figure 5:
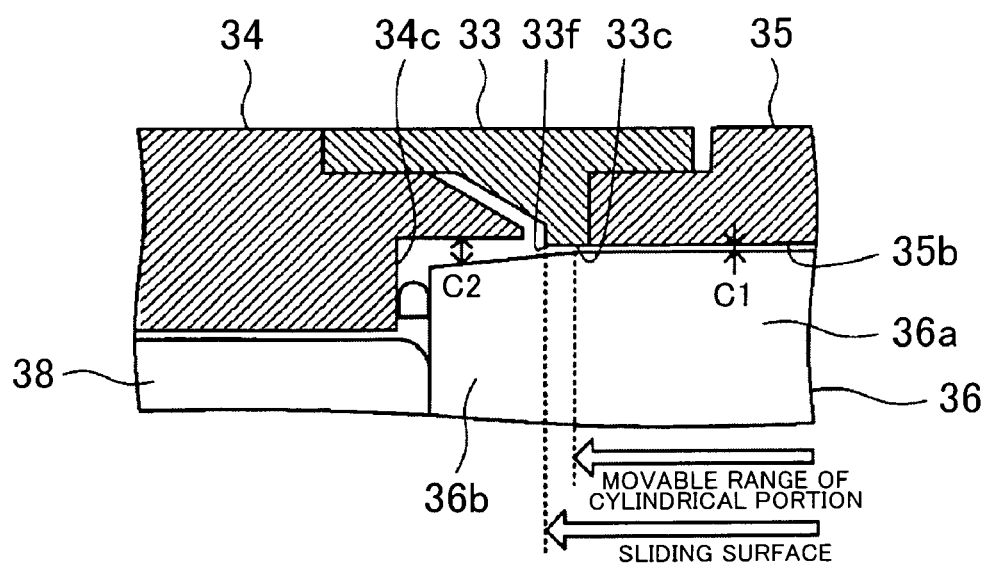
FIG. 5 is a partial enlarged view showing the first core, the second core, and the non-magnetic body in a solenoid portion.

FIG. 5 is a partial enlarged view showing the first core 34, the second core 35, and the non-magnetic body 33 in the solenoid portion 30. In the figure, "C1" indicates a clearance between the outer peripheral surface (not including the non-magnetic layer) of the plunger 36 and the inner peripheral surface 35b of the second core 35, and "C2" indicates a clearance between the outer peripheral surface (not including the non-magnetic layer) of the plunger 36 and the inner peripheral surface of the recess 34c of the first core 34. The smaller the clearance C1 is, the more the magnetic efficiency is improved and the more the attraction force of the plunger 36 is increased. However, the smaller the clearance C1 is, the more the slidability of the plunger 36 tends to be degraded. As described above, the inner peripheral surface 33d of the thick wall portion 33c of the non-magnetic body 33 functions together with the inner peripheral surface 35b of the second core 35 as a sliding surface slidably supporting the plunger 36. The distance by which the plunger 36 moves beyond the sliding surface is therefore shorter than in the case where only the inner peripheral surface 35b of the second core 35 functions as the sliding surface. As a result, the slidability of the plunger 36 is improved.

Accordingly, the clearance C1 can be reduced by the amount corresponding to the improvement in slidability of the plunger 36, and the magnetic efficiency can be improved accordingly. Moreover, the clearance C2 between the outer peripheral surface of the plunger 36 and the inner peripheral surface of the recess 34c of the first core 34 needs to be designed so that the plunger 36 does not contact the first core 34 even if the plunger 36 reciprocates in a tilted state. Since the distance by which the plunger 36 moves beyond the sliding surface is reduced, the clearance C2 can also be reduced, whereby the magnetic efficiency can also be improved accordingly.

As shown in FIG. 5, the plunger 36 is formed by a cylindrical portion 36a and a tapered portion 36b. The cylindrical portion 36a has a uniform diameter and slides along the inner peripheral surface 35b of the second core 35. The tapered portion 36b has a diameter reduced toward its end located on the first core 34 side. The starting point of the tapered portion 36b (the boundary point between the cylindrical portion 36a and the tapered portion 36b) is designed so that a movable range of the cylindrical portion 36a does not go beyond the inner peripheral surface 33b of the non-magnetic body 33 and the inner peripheral surface 35b of the second core 35 (the sliding surface). This is in order to prevent an outer peripheral surface of the cylindrical portion 36a from being roughly engaged at an edge 33f of the thick wall portion 33c of the non-magnetic body 33 when the plunger 36 reciprocates in a tilted state.

When the coil 32 in this solenoid portion 30 is energized, a magnetic circuit is formed in which a magnetic flux flows around the coil 32 in the order of the case 31, the second core 35, the plunger 36, the first core 34, and the case 31. As a result, an attraction force is caused between the first core 34 and the plunger 36, whereby the plunger 36 is attracted. As described above, the shaft 38 that is axially slidable along the inner peripheral surface of the first core 34 abuts on the tip of the plunger 36. The shaft 38 is therefore pressed forward (in the left-hand direction in the figure) as the plunger 36 is attracted.

The pressure-regulating valve portion 40 is structured as an element that is incorporated into a valve body (not shown). The pressure-regulating valve portion 40 includes an approximately cylindrical sleeve 50, a spool 60, an end plate 42, and a spring 44. The sleeve 50 has its one end attached to the case 31 and the first core 34 of the solenoid portion 30. The spool 60 is inserted into the inner space of the sleeve 50 and has its one end abutting on a tip of the shaft 38 of the solenoid portion 30. The end plate 42 is screwed in the other end of the sleeve 50. The spring 44 is provided between the end plate 42 and the other end of the spool 60 and biases the spool 60 toward the solenoid portion 30. Note that the end plate 42 can fine-adjust the biasing force of the spring 44 by adjusting the screw position.

The sleeve 50 has an input port 52, an output port 54, a drain port 56, and a feedback port 58 as openings of the inner surface of the sleeve 50. The input port 52 is formed approximately in the middle of the sleeve 50 in FIG. 1 and receives a working fluid. The output port 54 is formed at a leftward (spring 44 side) position in FIG. 1 and discharges the working fluid. The drain port 56 is formed at the leftmost position in FIG. 1 and drains the working fluid. The feedback port 58 is formed at a rightward (solenoid portion 30 side) position in FIG. 1. The feedback port 58 receives the working fluid from the output port 54 through an oil passage 58a formed by an inner surface of the valve body and an outer surface of the sleeve 50, and feeds back the received working fluid to the spool 60. The sleeve 50 further has discharge ports 59a, 59b at its both ends. The discharge ports 59a, 59b discharge the working fluid leaked between an inner peripheral surface of the sleeve 50 and an outer peripheral surface of the spool 60 as the spool 60 slides.

The spool 60 is formed as a shaft-like member that is inserted into the sleeve 50. As shown in FIG. 1, the spool 60 includes three cylindrical lands 62, 64, 66, a communicating portion 68, and a connecting portion 69. The lands 62, 64, 66 have an outer diameter approximately equal to the inner diameter of the sleeve 50. The communicating portion 68 connects the middle land 62 and the leftward (spring 44 side) land 64 in the figure. The communicating portion 68 has an outer diameter smaller than that of the lands 62, 64, and is tapered so that the outer diameter is reduced from the lands 62, 64 toward the middle. The communicating portion 68 is capable of communicating the input port 52, the output port 54, and the drain port 56 with each other. The connecting portion 69 connects the middle land 62 and the rightward (solenoid portion 30 side) land 66 in the figure to each other, and forms together with the inner wall of the sleeve 50 a feedback chamber 70 for applying a feedback force to the spool 60.

Operation of the electromagnetic valve 20 of the embodiment thus structured will now be described. It is herein assumed that the coil 32 has been deenergized. In this state, the spool 60 has been moved toward the solenoid 30 by the biasing force of the spring 44. The input port 52 and the output port 54 therefore communicate with each other through the communicating port 68. In addition, the land 64 disconnects the output port 54 and the drain port 56 from each other. Accordingly, an oil pressure is applied to the output port 54.

When the coil 32 is energized, the plunger 36 is attracted toward the first core 34 by the attraction force according to the magnitude of a current applied to the coil 32. The shaft 38 with the spool 60 abutting on the tip thereof is therefore pushed out forward, and the spool 60 is moved toward the spring 44. At this time, the spool 60 stops at a position where the thrust (attraction force) of the plunger 36, the spring force of the spring 44, and the feedback force applied from the feedback port 58 to the spool 60 are balanced. The more the spool 60 is moved toward the spring 44, the more the opening area of the input port 52 is reduced and the more the opening area of the drain port 56 is increased. When the spool 60 is moved toward the spring 44 to the full extent, the input port 52 is completely closed by the land 62 and the output port 54 and the drain port 56 communicate with each other. No oil pressure is therefore applied to the output port 54.

In an exemplary aspect of the invention, by improving the magnetic efficiency of the solenoid portion 30, required attraction force of the plunger 36 can be assured by using a small solenoid portion 30. The electromagnetic valve 20 of the embodiment can thus be reduced in size.

According to an exemplary aspect of the invention, the electromagnetic valve 20 of the embodiment described above, the inner peripheral surface 33d of the thick wall portion 33c of the non-magnetic body 33 and the inner peripheral surface 35b of the second core 35 are formed so as to be flush with each other. The inner peripheral surface 33d of the thick wall portion 33c of the non-magnetic body 33 therefore functions together with the inner peripheral surface 35b of the second core 35 as a sliding surface for slidably supporting the plunger 36. Slidability of the plunger 36 can thus be improved. This enables reduction in clearance C1 between the outer peripheral surface of the plunger 36 and the inner peripheral surface 35b of the second core 35 and reduction in clearance C2 between the outer peripheral surface of the plunger 36 and the inner peripheral surface of the recess 34c of the first core. As a result, the magnetic efficiency can be improved, and the capability of the electromagnetic valve 20 can be improved.

Moreover, since the inner peripheral surface 33d of the thick wall portion 33c of the non-magnetic body 33 and the inner peripheral surface 35b of the second core 35 are formed by cutting the inner wall after the non-magnetic body 33 and the second core 35 are joined together. Accordingly, part accuracy can be improved as compared to the case where the inner peripheral surface 33d of the thick wall portion 33c of the non-magnetic body 33 and the inner peripheral surface 35b of the second core 35 are formed separately and the first core 34, the non-magnetic body 33, and the second core 35 are then joined together. As a result, the slidability of the plunger 36 can further be improved. This enables reduction in magnetic clearance between the second core 35 and the plunger 36.

In addition, the second core 35 and the non-magnetic body 33 can be regarded as an integral member in terms of part accuracy. Accordingly, it is only necessary to consider the manufacturing error between two members, that is, the integral member and the first core 34. As a result, the inner peripheral surface of the first core 34 can be made closer to the plunger 36 side, and the magnetic clearance between the first core 34 and the plunger 36 can be reduced, whereby the magnetic efficiency can further be improved.

Moreover, according to the electromagnetic valve 20 of the embodiment, the non-magnetic body 33 and the first core 34 are joined together with the abutting portion 33e at the tip of the thin wall portion 33a abutting on the stepped portion 34e so that the thick wall portion 33c does not contact the tapered portion 34d. Accordingly, when the non-magnetic body 33 and the first core 34 are joined together, the tapered portion 34d and the tip portion 34f can be prevented from being deformed by the thick wall portion 33c due to the manufacturing tolerance of the non-magnetic body 33 and the first core 34. As a result, the accuracy of the tapered portion 34d and the tip portion 34f can be assured.

Moreover, according to the electromagnetic valve 20 of the embodiment, the starting point of the tapered portion 36b of the plunger 60 is designed so that the movable range of the cylindrical portion 36a does not go beyond the sliding surface. The outer peripheral surface of the cylindrical portion 36a can therefore be prevented from being roughly engaged at the edge 33f of the thick wall portion 33c of the non-magnetic body 33 when the plunger 36 reciprocates in a tilted state.

In an exemplary aspect of the invention, the plunger 36 corresponds to a "movable core," the first core 34 corresponds to a "first fixed core," the second core 35 corresponds to a "second fixed core," and the non-magnetic body 33 corresponds to a "non-magnetic member."

In the electromagnetic valve 20 of the embodiment, the inner peripheral surface 33d of the non-magnetic body 33 and the inner peripheral surface 35b of the second core 35 are formed by cutting the inner wall after the non-magnetic body 33 and the second core 35 are joined together. However, the non-magnetic body 33 and the second core 35 may alternatively be joined together after the inner peripheral surface 33d of the non-magnetic body 33 and the inner peripheral surface 35b of the second core 35 are formed separately. Note that the dimensional accuracy is somewhat reduced in this case.

With this structure, slidability of the movable core can be improved. As a result, a magnetic clearance between the second fixed core and the movable core can be reduced, whereby magnetic efficiency can be improved and capability of the device can be improved.

In the electromagnetic valve 20 of the embodiment, the plunger 36 is formed by the cylindrical portion 36a having a uniform diameter and the tapered portion 36a having a diameter reduced toward its end located on the first core 34 side. However, the tapered portion 36a need not necessarily be formed.

The electromagnetic valve 20 of the embodiment is described to be used in hydraulic control of a clutch and a brake incorporated in an automatic transmission. However, the electromagnetic valve 20 may alternatively be used in fluid pressure control of any operative mechanism that is operated by a fluid pressure.

In an exemplary aspect of the invention, the invention is described in the form of the electromagnetic valve having the solenoid portion 30 and the pressure-regulating valve portion 40. However, the invention may also be in the form of a solenoid device.

It should be understood that, although the best modes for carrying out the invention have been described above based on an exemplary aspect of the invention, the invention is not limited to the embodiment described above and may be embodied in various forms without departing from the subject matter of the present invention.

According to an exemplary aspect of the invention, a coaxial property between the first fixed core and the second fixed core can be improved as compared to the case where the respective inner peripheral surfaces of the first fixed core, the second fixed core, and the non-magnetic member are processed separately and the three members are then assembled together. Slidability of the movable core can therefore be improved. This enables reduction in magnetic clearance between the second fixed core and the movable core. In addition, the second fixed core and the non-magnetic member can be regarded as an integral member in terms of part accuracy. Accordingly, it is only necessary to consider the manufacturing error between two members, that is, the integral member and the first fixed core. As a result, the inner peripheral surface of the first fixed core can be made closer to the movable core side, and the magnetic clearance between the first fixed core and the movable core can be reduced, whereby the magnetic efficiency can further be improved.

According to an exemplary aspect of the invention, regardless of the manufacturing tolerance of the first fixed core and the non-magnetic member, accuracy of the tapered portion can be maintained when the first fixed core and the non-magnetic member are assembled together. Desired magnetic efficiency can therefore be obtained. In the linear solenoid device according to this aspect of the present invention, the tapered portion may have a tip portion formed at its tip and the tip portion may have a predetermined thickness at its end face. The non-magnetic member may be joined to the first fixed core at the abutting portion so that the non-magnetic member does not abut on the tip portion. In this case, accuracy of the tip portion can also be maintained, whereby the desired magnetic efficiency can be more reliably obtained.

According to an exemplary aspect of the invention, the movable core will not abut on an end (edge) of the non-magnetic member even if the movable core slides in a somewhat tilted state. As a result, hindrance of smooth sliding of the movable core can be prevented.

According to an exemplary aspect of the invention, since the electromagnetic valve of the present invention includes the linear solenoid device according to any of the above aspects of the present invention, the same effects as those of the linear solenoid device of the present invention can be obtained. For example, the following effects can be obtained: slidability of the movable core can be improved; the magnetic efficiency can be improved; the device capability can be improved; the coaxial property between the first fixed core and the second fixed core can be improved as compared to the case where the respective inner peripheral surfaces of the first fixed core, the second fixed core, and the non-magnetic member are processed separately and the three members are then assembled together; regardless of the manufacturing tolerance of the first fixed core and the non-magnetic member, accuracy of the tapered portion can be maintained when the first fixed core and the non-magnetic member are assembled together, whereby desired magnetic efficiency can be obtained; and the movable core will not abut on the end (edge) of the non-magnetic member even if the movable core slides in a somewhat tilted state, whereby hindrance of smooth sliding of the movable core can be prevented.

The invention claimed is:

1. A linear solenoid device comprising:
   an energizable coil;
   a movable core;
   a first fixed core as a magnetic member having a recess capable of accommodating one end of the movable core;
   a second fixed core as a magnetic member having an inner peripheral surface slidably supporting the movable core; and
   an annular non-magnetic member coaxially connecting the first fixed core and the second fixed core to each other, wherein:
   the linear solenoid device is capable of being driven by an attraction force applied to the movable core towards the first fixed core upon energization of the coil,
   the non-magnetic member is formed so that an inner peripheral surface of the non-magnetic member functions together with the inner peripheral surface of the second fixed core as a sliding surface along which the movable core is slidable, the first fixed core has a tapered portion having an outer diameter reduced toward an opening end of the recess, and the non-magnetic member is joined to the first fixed core at an abutting portion formed on an outer periphery of the non-magnetic member configured such that the non-magnetic member does not abut on the tapered portion, and the tapered portion fits within the non-magnetic member.

2. The linear solenoid device according to claim 1, wherein the non-magnetic member is formed so that the inner peripheral surface of the non-magnetic member and the inner peripheral surface of the second fixed core become flush with each other.

3. The linear solenoid device according to claim 2, wherein the inner peripheral surface of the non-magnetic member and the inner peripheral surface of the second fixed core are formed by processing an inner wall after the non-magnetic member and the second fixed core are integrally joined together.

4. The linear solenoid device according to claim 3, wherein:
a distal end of the tapered portion defines a tip portion that has a predetermined thickness at an end face of the tip portion, and
the non-magnetic member is joined to the first fixed core at the abutting portion so that the non-magnetic member does not abut on the tip portion.

5. The linear solenoid device according to claim 4, wherein:
the movable core is formed by a cylindrical portion having an approximately uniform outer diameter and a tapered portion having an outer diameter reduced towards an end of the tapered portion located on the first fixed core side, and
the tapered portion of the movable core is formed so that a movable range of the cylindrical portion does not go beyond the sliding surface.

6. An electromagnetic valve, comprising:
the linear solenoid device according to claim 5, and
a valve device that opens and closes according to driving of the linear solenoid device.

7. The linear solenoid device according to claim 5, wherein the recess of first fixed core includes a spacer, which is oriented in the recess such that the moveable core does not abut directly on the first fixed core.

8. The linear solenoid device according to claim 1, wherein:
a distal end of the tapered portion defines a tip portion that has a predetermined thickness at an end face of the tip portion, and
the non-magnetic member is joined to the first fixed core at the abutting portion so that the non-magnetic member does not abut on the tip portion.

9. The linear solenoid device according to claim 1, wherein:
the movable core is formed by a cylindrical portion having an approximately uniform outer diameter and a tapered portion having an outer diameter reduced towards an end of the tapered portion located on the first fixed core side, and
the tapered portion of the movable core is formed so that a movable range of the cylindrical portion does not go beyond the sliding surface.

10. An electromagnetic valve, comprising:
the linear solenoid device according to claim 1, and
a valve device that opens and closes according to driving of the linear solenoid device.

11. The linear solenoid device according to claim 1, wherein the recess of first fixed core includes a spacer, which is oriented in the recess such that the moveable core does not abut directly on the first fixed core.

* * * * *